United States Patent

Liaw

[11] Patent Number: 5,536,054
[45] Date of Patent: Jul. 16, 1996

[54] LOLLYPOP HOLDER

[75] Inventor: Chu-Yuan Liaw, Taipei, Taiwan

[73] Assignee: Jyco Inc., Taipei, Taiwan

[21] Appl. No.: 365,578

[22] Filed: Dec. 28, 1994

[51] Int. Cl.$^6$ ............................... B25J 1/00; A63H 33/00
[52] U.S. Cl. ........................ 294/1.1; 446/236; 446/266; 426/134
[58] Field of Search ................................. 294/1.1, 5.5, 8; 446/144, 145, 236, 266, 386, 491; 426/104, 134

[56] References Cited

U.S. PATENT DOCUMENTS

| | | | |
|---|---|---|---|
| 2,721,141 | 10/1955 | Leinhauser | 426/104 |
| 5,209,692 | 5/1993 | Coleman et al. | 446/266 |
| 5,471,373 | 11/1995 | Coleman et al. | 362/109 |

*Primary Examiner*—Dean Kramer
*Attorney, Agent, or Firm*—Salter & Michaelson

[57] ABSTRACT

A lollypop holder of the present invention is designed to move a lollypop having a stick and a piece of hard candy at an end thereof in a wobbling motion. The lollypop holder comprises a generally tubular housing having an elongate chamber formed therein wherein the housing is adapted to be gripped within a person's hand. A power supply and a motor are located within the chamber of the housing. The motor is energized by the power supply and has a drive shaft which is rotatably driven. A switch is provided for selectively operating the motor. A gear train is driven by the drive shaft of the motor, the gear train also being located within the chamber of the housing. A lollypop receiving member has a first end portion which extends out of one end of the housing, the first end portion of the receiving member having an opening formed therein for receiving and securing the stick of the lollypop therein. The lollypop receiving member has a second end portion opposite to the first end portion which is manipulated by the gear train to produce a wobbling motion of the lollypop wherein the receiving member reciprocally swivels from side-to-side and moves axially in-and-out with respect to the housing.

7 Claims, 3 Drawing Sheets

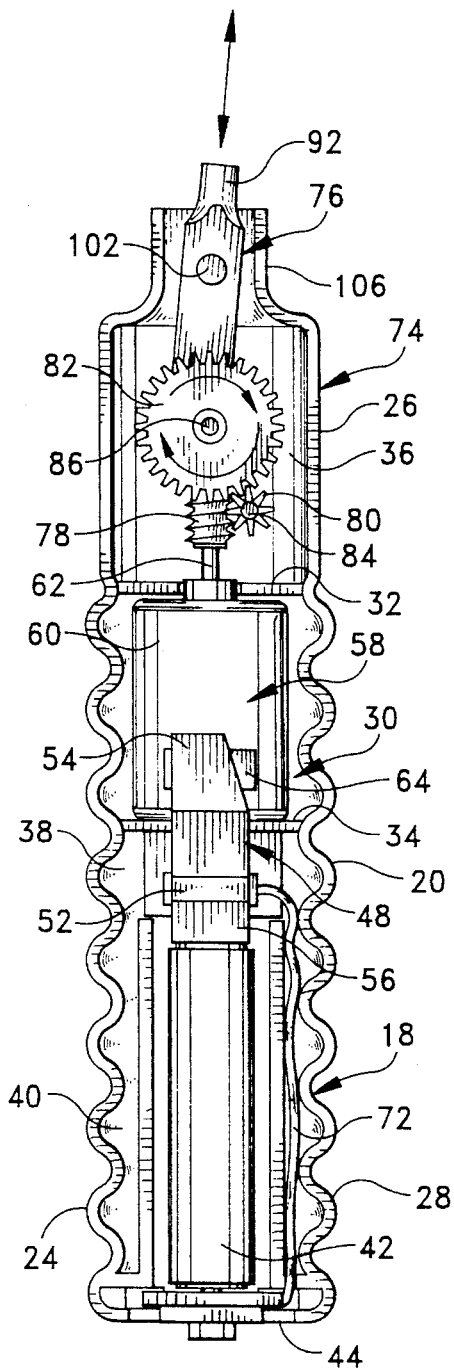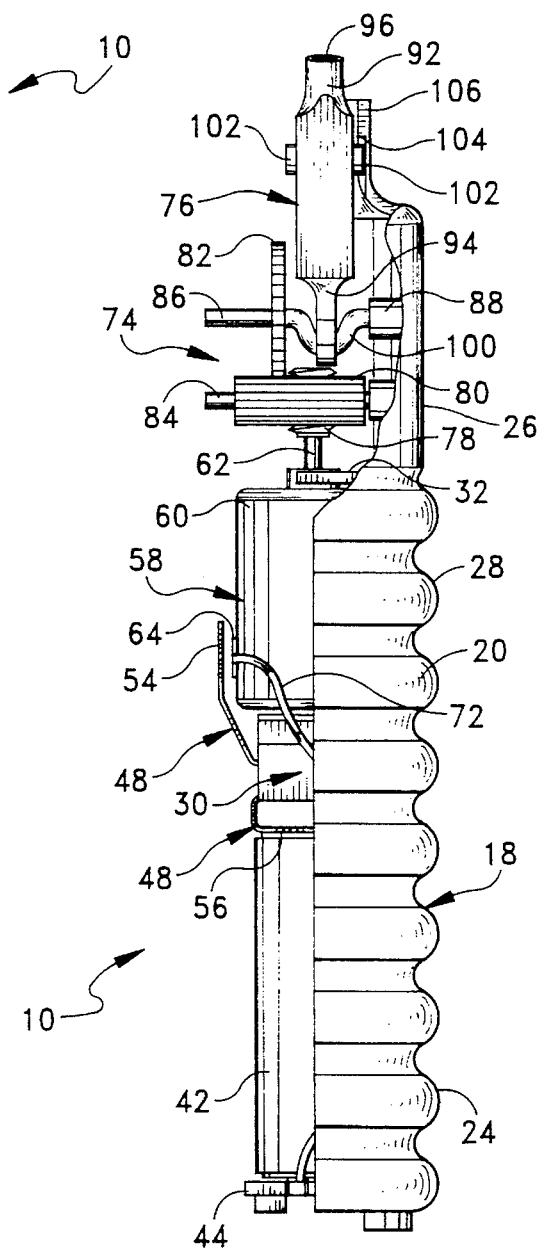
FIG. 4
FIG. 5

5,536,054

LOLLYPOP HOLDER

BACKGROUND AND SUMMARY OF THE INVENTION

This invention relates generally to lollypop holders, and more particularly to a lollypop holder capable of moving a lollypop in a wobbling motion.

Lollypops are popular candy treats for children of all ages. Presently, there are lollypop holders capable of rotating a lollypop of conventional design, i.e., having a stick and a piece of hard candy attached to an end thereof. The purpose of the holder is for entertaining and amusing its user, namely children. Many such holders may be operated by a hand crank and others may be battery powered. These holders, while providing some entertainment value to children, are only capable of rotating a lollypop about its longitudinal axis and are incapable of moving a lollypop in a wobbling motion in which the lollypop swivels from side-to-side and moves axially in-and-out with respect to the holder.

Among the several objects of the present invention are the provision of an improved lollypop holder which is especially suited for entertaining children; the provision of a lollypop holder which is capable of moving a lollypop in a wobbling motion in which the lollypop swivels from side-to-side and moves axially in-and-out with respect to the holder; the provision of such a lollypop holder which is motorized to move the lollypop in a wobbling motion upon depressing a push button; the provision of such a lollypop holder which may be easily held and operated by a child with the same hand holding the lollypop holder; and the provision of such a lollypop holder which is compact in design and easy to manufacture.

In general, a lollypop holder of the present invention is designed to move a lollypop having a stick and a piece of hard candy at an end thereof in a wobbling motion. The lollypop holder comprises a generally tubular housing having an elongate chamber formed therein wherein the housing is adapted to be gripped within a person's hand. A power supply and a motor are located within the chamber of the housing. The motor is energized by the power supply and has a drive shaft which is rotatably driven. A switch is provided for selectively operating the motor. A gear train is driven by the drive shaft of the motor, the gear train also being located within the chamber of the housing. A lollypop receiving member has a first end portion which extends out of one end of the housing, the first end portion of the receiving member having an opening formed therein for frictionally receiving and securing the stick of the lollypop therein. The lollypop receiving member has a second end portion opposite to the first end portion which is manipulated by the gear train to produce a wobbling motion of the lollypop wherein the receiving member reciprocally swivels from side-to-side and moves axially in-and-out with respect to the housing.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 4 is a front elevational view of the lollypop holder with portions of its housing removed to reveal its inner components; and FIG. 5 is a side elevational view of the lollypop holder with portions of its housing removed to reveal its inner components.

Corresponding reference numerals designate corresponding parts throughout the several views of the drawings.

DETAILED DESCRIPTION OF THE PREFERRED EMBODIMENT

Figure 1:
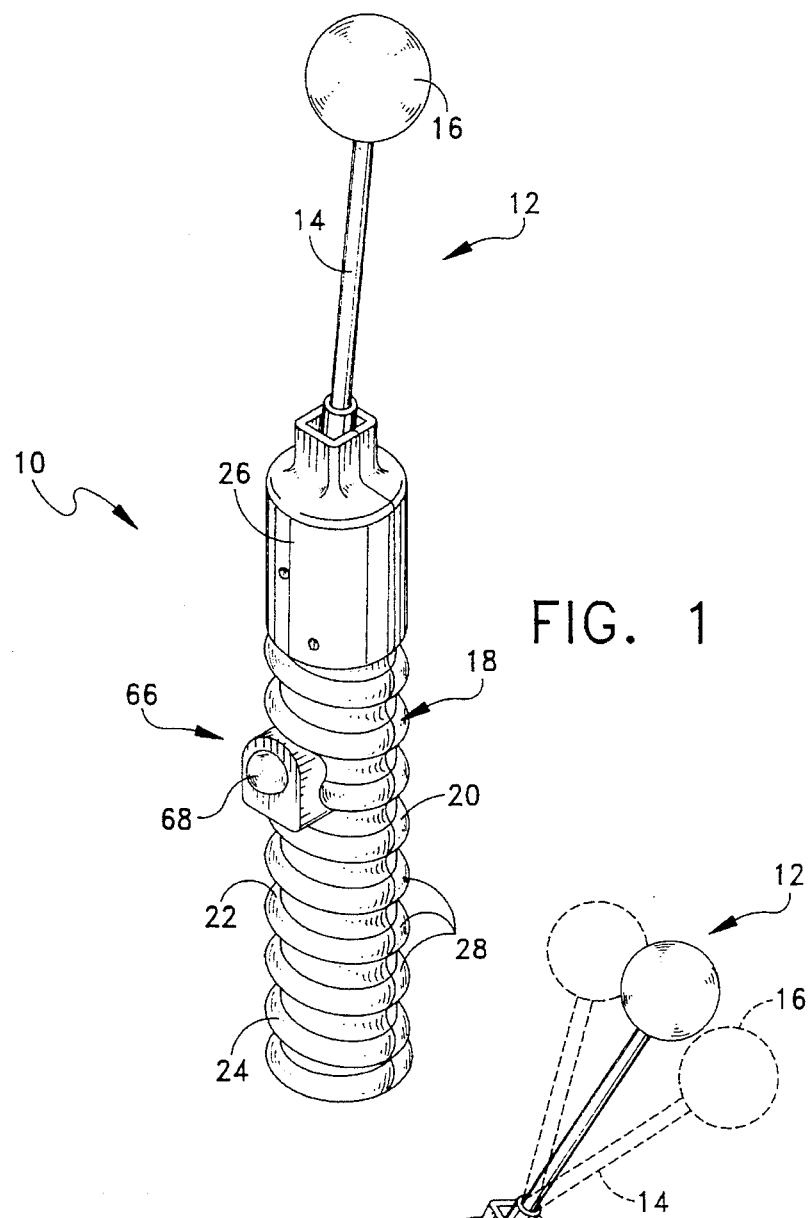
FIG. 1 is a perspective view of a lollypop holder of the present invention.
Figure 2:
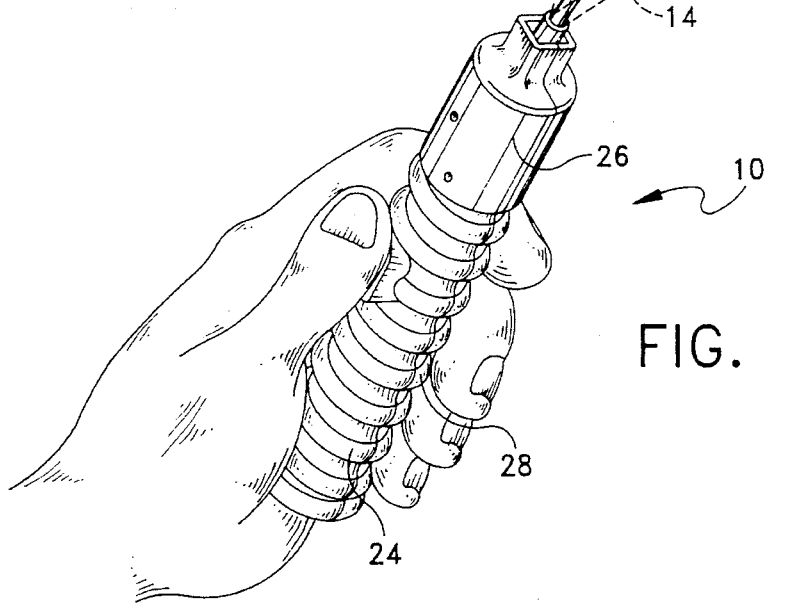
FIG. 2 is a perspective view of the lollypop holder being held in the hand of a user.

Referring now to the drawings, and more particularly to FIGS. 1 and 2, there is generally indicated at 10 a lollypop holder of the present invention which is capable of moving a lollypop, generally indicated at 12, in a wobbling motion. As illustrated, the lollypop 12 is a typical lollypop, having a thin, circular stick 14 fabricated from cardboard or rolled paper and a spherically-shaped piece of hard candy 16 mounted on an end of the stick 14. The lollypop holder 10 of the present invention is especially suited for moving the lollypop 12 from side-to-side and in-and-out thereby producing the wobbling motion which is particularly entertaining to children.

The lollypop holder 10 comprises a tubular housing, generally indicated at 18, which is preferably fabricated from plastic. The housing 18 is of two-piece construction, having a pair of mating semi-cylindrical walls 20, 22 attachable by pin members (not shown) formed on one of the walls (e.g., wall 22) which are received by means of an interference fit within openings (not shown) formed on the other wall (e.g., wall 20). The two walls 20, 22 may also be attached by any suitable adhesive. As shown in FIGS. 1 and 2, the housing 18 has a lower portion 24 which is adapted to be held in the person's hand and an upper portion 26 from which the lollypop 12 extends upwardly. The lower portion 24 is formed with corrugations 28 for facilitating gripping of portion 24 by the hand of the user, as shown in FIG. 2. As illustrated, the upper portion 26 is cylindrical. The housing 18 may be manufactured in any suitable manner, such as by an injection molding process. The lollypop holder 10 is designed to fit easily within a child's hand and is capable of being operated by the same hand, as illustrated in FIG. 2.

Figure 3:
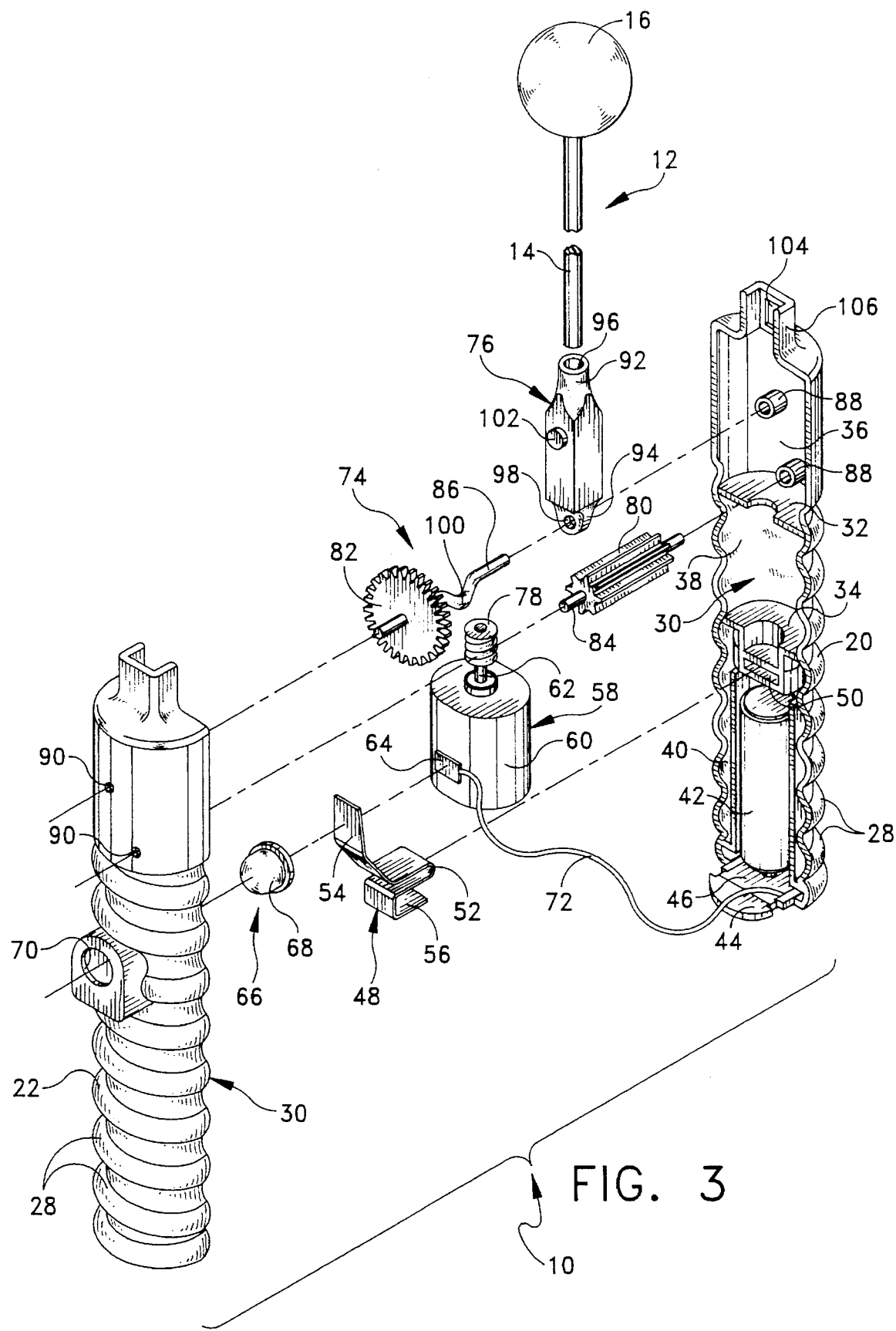
FIG. 3 is an exploded perspective view of the lollypop holder.

As shown best in FIG. 3, the interior of the housing 18 comprises an elongate chamber, generally indicated at 30, extending the length of the housing. Each wall 20, 22 of the housing 18 includes a pair of spaced-apart, semi-circular interior walls 32, 34 which divide the chamber 30 into three compartments, namely an upper compartment 36, a middle compartment 38 and a lower compartment 40. These compartments house the various electrical and mechanical components which cause the lollypop holder 10 to operate.

The lower compartment 40 of the chamber 30 receives a power supply of the lollypop holder 10. More specifically, the lower compartment 40 receives a battery 42 for powering the operation of the lollypop holder 10. Preferably, the battery 42 is a size AA battery of standard construction. An end wall 44 is pivotally attached to wall 20 of the housing 18 for maintaining the battery 42 within the lower compartment 40. The end wall 44 is pivotable between an open position in which the battery 42 may be inserted into or taken out of the lower compartment 40, and a closed position in which the battery 42 is maintained within the lower compartment 40. A metal plate 46 is mounted on the upper surface of the end wall 44 for engaging the positive terminal of the battery 42.

Located at the upper end of the lower compartment 40 is a sheet metal tab, generally indicated at 48, which is inserted into an opening 50 formed in the wall 20 of the housing 18 below the lower interior wall 34. As illustrated, the tab 48 includes a bend portion 52 which is inserted into the opening 50 and frictionally engages the wall 20 for securing its position, an upper finger 54 and a lower finger 56 which engages the negative terminal of the battery 42 when the battery is placed within the lower compartment 40.

Still referring to FIG. 3, a small, electrical motor, generally indicated at 58, is located within the middle compartment 38 of the chamber 30. The motor 58 comprises a cylindrical body 60 having a bottom surface which bears on the lower wall 34 of the housing 18 and a top surface having a drive shaft 62 extending upwardly therefrom. An electrical contact plate 64 is mounted on the side of the body 60 of the motor 58 (as by welding or adhesive), and is positioned such that it can engage the upper finger 54 of the tab 48 when the tab 48 is inserted into opening 50, and the motor is received in middle compartment 38. The motor 58 is of sufficient size for rotating the drive shaft 62 at a nominal speed.

A switch, generally indicated at 66, controls the operation of the motor 58. The switch 66 comprises a push button 68 fabricated from rigid plastic which is positioned adjacent the upper finger 54 of the tab 48 and contact plate 64 and extends radially outwardly of the housing 18 through an opening 70 formed in the housing 18. As shown in FIG. 2, the push button 68 is located conveniently so that it may be easily depressed by a person's thumb when the person is holding the lollypop holder 10 in their hand, for moving the upper finger 54 of the tab 48 towards the contact plate 64. A wire 72 electrically connects the contact plate 64 to the metal plate 46 of the end wall 44. Thus, upon being depressed by the person operating the lollypop holder 10, the push button 68 closes an electrical circuit between the battery 42 and the motor 58 thereby activating the operation of the motor which causes the drive shaft 62 to rotate at a constant speed.

A gear train, generally indicated at 74, is located in the upper compartment 36 of the chamber 30. The gear train 74 is driven by the drive shaft 62 of the motor 58 to manipulate a lollypop receiving member generally indicated at 76 which receives the stick 14 of the lollypop 12. The gear train 74 comprises a worm gear 78 mounted on the free end of the drive shaft 62 of the motor 58, a first spur gear 80 which is engaged and driven by the worm gear 78, and a second spur gear 82 which is engaged and driven by the first spur gear 80. The first and second spur gears 80, 82 are mounted on respective shafts 84, 86 which are rotatably mounted within the upper compartment 36 in the chamber 30 as illustrated in FIG. 3. More specifically, for each shaft 84, 86, one of its ends is rotatably received in an opening of a journal 88 formed on the inner surface of wall 20 and its other end extends through an opening 90 formed in the other wall 22. Preferably, the worm and spur gears 78, 80 and 82 are fabricated from rigid plastic and the shafts 84, 86 from metal, since the shafts and gears do not rotate at excessive speeds, bearings and lubrication are not required.

The receiving member 76 includes an upper (first) end portion 92 which extends out of an open upper end of the housing 18 and a lower (second) end portion 94 opposite to the upper end portion 92. The upper end portion 92 has an upwardly facing opening 96 formed therein for receiving and securing the stick 14 of the lollypop 12 therein. The opening 96 is sized so that the stick 14 slightly interferes with the receiving member 76 when it is placed within the opening 96 so that the lollypop 12 is securely held therein. The lower end portion 94 has a bore 98 formed therein extending transversely with respect to the length of the receiving member 76, the bore 98 receiving the shaft 86 of the second spur gear 82 therethrough. As illustrated, the second spur gear shaft 86 has an eccentric portion 100 which is received through the bore 98 of the lower end portion 94 of the receiving member 76 for producing the wobbling motion of the receiving member thereby causing the wobbling of the lollypop 12 secured therein. As the second spur gear shaft 86 rotates (see FIGS. 4 and 5), the eccentric portion 100 of the shaft follows a generally circular path thereby moving the receiving member 76 (and the lollypop 12) from side-to-side and axially in-and-out with respect to the housing 18.

The receiving member 76 further includes a pair of outwardly extending detents 102 which are received in recesses 104 formed within a reduced neck portion 106 of the housing 18 (see FIG. 3). The detents 102 prevent lateral movement of the receiving member 76 when operating the lollypop holder 10 and also provide a pivot mount for receiving member 76 so that eccentric 100 can swing it from side-to-side as illustrated in FIG. 4.

In operation, it will be observed in FIG. 2 that the lollypop holder 10 of the present invention may be easily grasped and operated in a child's hand. By depressing the push button 68 of the switch 66, an electrical circuit between the battery 42 and the motor 58 is closed thereby causing the activation of the motor and the rotation of the drive shaft 62. The worm gear 78 mounted on the drive shaft 62 engages the first spur gear 80 which in turn engages the second spur gear 82 for rotating the second spur gear shaft 86. The rotation of the second spur gear shaft 86 causes the lollypop receiving member 76 to wobble since the receiving member 76 is mounted on to the second shaft 86 at its eccentric portion 100. Thus, a lollypop 12 received within the bore 98 at the upper end portion 92 of the receiving member 76 wobbles. As mentioned above, this wobbling motion of the lollypop is particularly entertaining to children.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A lollypop holder for moving a lollypop having a stick and a piece of hard candy at an end thereof in a wobbling motion, said lollypop holder comprising:

a generally tubular housing having an elongate chamber formed therein, said housing being adapted to be gripped within a person's hand;

a power supply located within the chamber of the housing;

a motor energized by said power supply, said motor being located within the chamber of the housing and having a drive shaft which is rotatably driven;

a switch for selectively operating said motor;

a gear train driven by said drive shaft of the motor, the gear train being located within the chamber of the housing; and a lollypop receiving member having a first end portion which extends out of one end of the housing, said first end portion of the receiving member having an opening formed therein for receiving and securing the stick of the lollypop therein, said lollypop receiving member having a second end portion opposite to the first end portion which is manipulated by said gear train to produce a wobbling motion of the lollypop wherein the receiving member reciprocally swivels from side-to-side and moves axially in-and-out with respect to the housing.

2. The lollypop holder as set forth in claim 1, said housing having a lower portion which is adapted to be held in a person's hand and an upper portion from which the lollypop extends upwardly.

3. The lollypop holder as set forth in claim 2, said power supply being located in the chamber in the lower portion of the housing.

4. The lollypop holder as set forth in claim 3, said power supply comprising a battery.

5. The lollypop holder as set forth in claim 1, said switch having a push button extending radially beyond the housing, wherein said push button, upon being depressed by a user operating the lollypop holder, closes an electrical circuit between the power supply and the motor.

6. The lollypop holder as set forth in claim 1, said gear train comprising a worm gear mounted on said drive shaft of the motor, said worm gear engaging and driving a first spur gear rotatably mounted on a shaft within the chamber, said first spur gear engaging and driving a second spur gear rotatably mounted on a shaft within the chamber, said shaft of the second spur gear being connected to the second end portion of the receiving member to cause the wobbling motion of the receiving member when it is rotatably driven.

7. The lollypop holder as set forth in claim 6, said second spur gear shaft having an eccentric portion which is received through an opening formed in the second end portion of the receiving member for producing the wobbling motion of the receiving member.

* * * * *